United States Patent
Sun et al.

(10) Patent No.: US 10,313,059 B2
(45) Date of Patent: Jun. 4, 2019

(54) DATA SENDING FEEDBACK METHOD AND APPARATUS, AND DATA SENDING METHOD AND APPARATUS

(71) Applicant: ZTE Corporation, Shenzhen (CN)

(72) Inventors: Bo Sun, Shenzhen (CN); Kaiying Lv, Shenzhen (CN); Nan Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 94 days.

(21) Appl. No.: 15/501,952

(22) PCT Filed: Nov. 26, 2014

(86) PCT No.: PCT/CN2014/092304
§ 371 (c)(1),
(2) Date: Feb. 6, 2017

(87) PCT Pub. No.: WO2015/154485
PCT Pub. Date: Oct. 15, 2015

(65) Prior Publication Data
US 2017/0230146 A1    Aug. 10, 2017

(30) Foreign Application Priority Data
Aug. 6, 2014 (CN) .......................... 2014 1 0385338

(51) Int. Cl.
*H04W 4/00* (2018.01)
*H04L 1/16* (2006.01)
(Continued)

(52) U.S. Cl.
CPC .............. *H04L 1/1607* (2013.01); *H04L 1/08* (2013.01); *H04L 1/16* (2013.01); *H04L 1/1854* (2013.01)

(58) Field of Classification Search
CPC ....... H04L 1/1607; H04L 1/1854; H04L 1/08; H04L 1/16
See application file for complete search history.

(56) References Cited

U.S. PATENT DOCUMENTS 9,924,512 B1 * 3/2018 Zhang ............... H04W 72/0453
2009/0044065 A1 * 2/2009 She ........................ H04L 1/06
714/748
(Continued)

FOREIGN PATENT DOCUMENTS

CN        101662798 A    3/2010
CN        101734265 A    6/2010
(Continued)

OTHER PUBLICATIONS

International Search Report for corresponding application No. PCT/CN2014/092304 filed on Nov. 26, 2014; dated Apr. 29, 2015.
(Continued)

*Primary Examiner* — Clemence S Han
(74) *Attorney, Agent, or Firm* — Cantor Colburn LLP

(57) ABSTRACT

Provided are a data sending feedback method and apparatus, and a data sending method and apparatus. According to data sending feedback method, when reception of a radio frame fails, a receiving station detects whether transmission of the radio frame over a specified sub-channel in a working channel ends within predetermined time; after the receiving station detects that the transmission of the radio frame over the specified sub-channel in the working channel ends within the predetermined time, the receiving station sends a feedback frame to a sending station of the radio frame.

20 Claims, 4 Drawing Sheets

(51) Int. Cl.
    *H04L 1/08*    (2006.01)
    *H04L 1/18*    (2006.01)

(56) References Cited

U.S. PATENT DOCUMENTS

| | | | |
|---|---|---|---|
| 2011/0110351 A1* | 5/2011 | Seok | H04W 4/20 |
| | | | 370/338 |
| 2013/0172035 A1 | 7/2013 | Wentink | |
| 2015/0131517 A1* | 5/2015 | Chu | H04L 5/0007 |
| | | | 370/312 |
| 2015/0146808 A1* | 5/2015 | Chu | H04L 5/0037 |
| | | | 375/260 |
| 2015/0250003 A1* | 9/2015 | Seok | H04W 74/0816 |
| | | | 370/329 |
| 2017/0208153 A1* | 7/2017 | Li | H04L 1/00 |

FOREIGN PATENT DOCUMENTS

| | | |
|---|---|---|
| CN | 102761399 A | 10/2012 |
| JP | 2010193039 A | 9/2010 |
| WO | 2006132467 A1 | 12/2006 |

OTHER PUBLICATIONS

European Search Report for corresponding application EP 14 88 8620; Report dated Jul. 13, 2017.
Yoriko Utsunomiya, "A Medium Access Control Protocol with Retransmission using NACK and Directional Antennas for Broadcasting in Wireless Ad-Hoc Networks", 5th European Wireless Conference, Feb. 27, 2004, XP055387554.

* cited by examiner

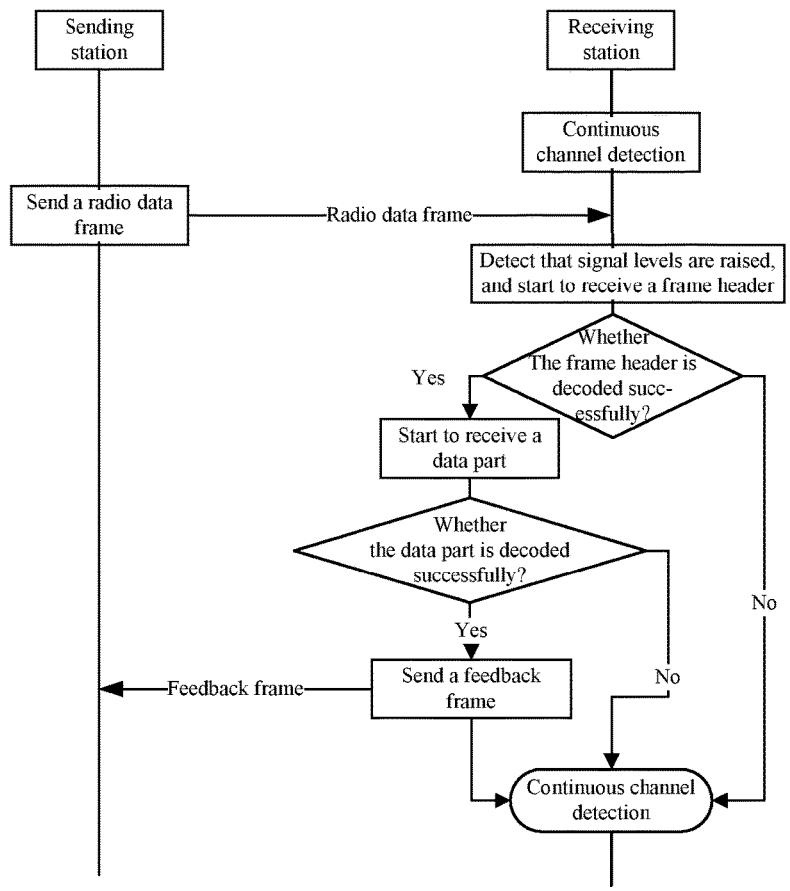

Fig. 1
(Prior Art)

| When reception of a radio frame fails, a receiving station detects whether transmission of the radio frame over a specified sub-channel in a working channel ends within predetermined time | S202 |
|---|---|
| After the receiving station detects that the transmission of the radio frame over the specified sub-channel in the working channel ends within the predetermined time, the receiving station sends a feedback frame to a sending station of the radio frame | S204 |

Fig. 2

DATA SENDING FEEDBACK METHOD AND APPARATUS, AND DATA SENDING METHOD AND APPARATUS

TECHNICAL FIELD

The present disclosure relates to the field of communications, and in particular to a data sending feedback method and apparatus, and a data sending method and apparatus.

BACKGROUND

At present, in the field of wireless networks, Wireless Local Area Network (WLAN) develops rapidly, and application demands for the WLAN are continuously increasing. In an Institute of Electrical and Electronic Engineers (IEEE) 802.11 set, a series of standardized common WLAN technologies such as 802.11a, 802.11b and 802.11g are defined in sequence, and other task groups, dedicated to development of specifications involving technical improvements on the existing 802.11 standards, emerge one by one. Among these task groups, the 802.11ah task group is dedicated to develop a WLAN network air interface standard for adopting license-free bands under 1 GHz, aiming at offering support for new network applications such as a smart power grid and a sensor network.

A Carrier Sense Multiple Access with Collision Avoidance (CSMA/CA) of the WLAN enables a plurality of stations share a wireless channel. When a station obtains an access grant of the wireless channel and sends a radio frame to another station, the former station may require the latter station to feed back an acknowledgement (ACK) radio frame. When a station successfully receives a radio frame sent thereto and the radio frame requires feedback of an ACK radio frame, the station sends an ACK radio frame after a fixed interframe space (interframe interval).

Meanwhile, the WLAN also supports a virtual carrier detection method, that is, a station maintains a local Network Allocation Vector (NAV), which decreases with time. When a radio frame not intended for a receiving station is received, the receiving station updates the local NAV according to a value in a DURATION domain of the received radio frame. When the local NAV is not zero, the station cannot compete for a channel to perform data transmission. Before sending data, the station needs to check whether the local NAV thereof is zero. The station needs to check a local NAV state unless the station successfully receives a radio frame and an ACK frame is required.

As shown in FIG. 1, according to a current data sending feedback solution, an ACK frame indicating successful receiving may be returned only when a receiver successfully receives a radio frame. When the sender does not successfully receive the ACK frame within appointed time, it will be regarded that the previous radio frame is unsuccessfully sent. This method does not support sending of a feedback frame indicating failure, and a sender cannot learn a receiving situation of the radio frame in time.

An effective solution is not proposed yet for the above-mentioned problems in the related art.

SUMMARY

The embodiments of the present disclosure provide a data sending feedback method and apparatus, and a data sending method and apparatus, which are intended to at least solve the above-mentioned technical problem in the related art that a receiving station does not send a feedback frame upon unsuccessful reception of a radio frame and thus a sending station cannot learn a receiving condition of the radio frame in time.

According to an embodiment of the present disclosure, a data sending feedback method is provided, which may include that: when reception of a radio frame fails, a receiving station detects whether transmission of the radio frame over a specified sub-channel in a working channel ends within predetermined time; and after the receiving station detects that the transmission of the radio frame over the specified sub-channel in the working channel ends within the predetermined time, the receiving station sends a feedback frame to a sending station of the radio frame.

In an exemplary embodiment, the step that the receiving station detects whether the transmission of the radio frame over the specified sub-channel in the working channel ends within predetermined time may include that: the receiving station receives a physical preamble part of the radio frame over the specified sub-channel; the receiving station parses the physical preamble part to obtain a specified parameter; and the receiving station determines, according to the specified parameter, whether the transmission of the radio frame over the specified sub-channel ends within the predetermined time, and determines that the receiving station is a target receiving station of the radio frame.

In an exemplary embodiment, the predetermined time may be ending time of the transmission of the radio frame and is determined by the receiving station according to the specified parameter.

In an exemplary embodiment, the specified parameter may carry at least one of the following information: first parameter information for indicating the target receiving station of the radio frame; and second parameter information for determining a sending duration of the radio frame.

In an exemplary embodiment, the receiving station may consider that the reception of the radio frame fails under one of the conditions that: the receiving station successfully decodes a physical preamble part corresponding to the radio frame over any one sub-channel in the working channel, and unsuccessfully decodes the physical preamble part over any one sub-channel; the receiving station successfully decodes the physical preamble part corresponding to the radio frame over any one sub-channel in the working channel, and a bandwidth sum of all sub-channels over which decoding is performed successfully is inconsistent with a bandwidth obtained by decoding; and the receiving station successfully decodes the physical preamble part corresponding to the radio frame over any one sub-channel in the working channel, and unsuccessfully decodes a data part.

In an exemplary embodiment, the feedback frame may carry at least one of the following information: unsuccessful reception of the radio frame, available sub-channel or available bandwidth information of the receiving station, and information for determining a retransmission parameter of the sending station.

In an exemplary embodiment, the information for determining the retransmission parameter of the sending station may include at least one of: link adaptation information assisting in radio frame retransmission, a radio frame retransmission mode indicator, and information for indicating radio frame code blocks needing to be retransmitted.

In an exemplary embodiment, the radio frame may include a physical preamble part and a data part, wherein the physical preamble part is sent over one or more sub-channels of the radio frame, and the data part is sent over the entire working channel.

In an exemplary embodiment, the step that the receiving station detects whether the transmission of the radio frame over the specified sub-channel in the working channel ends within the predetermined time may include that: when the receiving station successfully decodes a physical preamble part of the radio frame over the specified sub-channel, the receiving station detects a signal strength on the specified sub-channel; and it is judged, according to the signal strength, whether the transmission of the radio frame over the specified sub-channel ends.

In an exemplary embodiment, the step that the receiving station sends the feedback frame to the sending station of the radio frame may include that: the receiving station sends the feedback frame over the specified sub-channel over which the transmission of the radio frame ends within the predetermined time.

In an exemplary embodiment, the specified sub-channel may be an independent sub-channel, and the step that the receiving station sends the feedback frame over the specified sub-channel over which the transmission of the radio frame ends within the predetermined time may include that: the receiving station successfully decodes a physical preamble part of the radio frame over the independent sub-channel, and the independent sub-channel is in an idle state after transmission time of the radio frame expires; and the receiving station sends, after a preset interframe space, the feedback frame over one or more independent sub-channels over which the physical preamble part is successfully decoded.

In an exemplary embodiment, contents of a data part of the feedback frame sent over a plurality of independent sub-channels may be identical.

In an exemplary embodiment, the independent sub-channel over which the physical preamble part corresponding to the radio frame is decoded successfully may be determined in the following mode.

First parameter information capable of being used in calculating transmission time of the radio frame and second parameter information indicative of identification information of the target receiving station in the physical preamble part are successfully decoded.

In an exemplary embodiment, the first parameter information may include: a load length of a data part of the radio frame and a transmission rate indicator used for transmitting the data part.

In an exemplary embodiment, it may be determined that the independent sub-channel is in the idle state after transmission time of the radio frame expires under one of the conditions that: received signal strength of the independent sub-channel over which the physical preamble part is decoded successfully keeps lower than a preset threshold for a preset time period after transmission time of the radio frame expires; and idle time of the independent sub-channel over which the physical preamble part is decoded successfully is compared with the transmission time of the radio frame, and when a difference between the idle time of the independent sub-channel and the transmission time of the radio frame is within a preset range, it is determined that the independent sub-channel is in the idle state.

In an exemplary embodiment, before the receiving station sends the feedback frame over the specified sub-channel over which the transmission of the radio frame ends within the predetermined time, the method may further include that: it is judged whether a local NAV is zero, wherein when a judgement result indicates that the local NAV is zero, the feedback frame is sent, and otherwise, the feedback frame is not sent.

In an exemplary embodiment, the specified sub-channel may include: a main channel of the radio frame.

According to another embodiment of the present disclosure, a data sending method is provided, which may include that: a sending station sends a first radio frame; the sending station receives a feedback frame indicating that reception of the first radio frame fails; and after the feedback frame is received, the sending station sends a second radio frame after a preset interframe space, wherein the feedback frame is sent by a receiving station after the receiving station detects that transmission of the first radio frame over a specified sub-channel in a working frame ends within predetermined time, and the second radio frame is a retransmission frame of the first radio frame.

In an exemplary embodiment, the feedback frame may carry at least one of the following information: unsuccessful reception of the first radio frame, available sub-channel or available bandwidth information of the receiving station, and information for determining a retransmission parameter of the sending station.

In an exemplary embodiment, the information for determining the retransmission parameter of the sending station may include at least one of: link adaptation information assisting in radio frame retransmission, a radio frame retransmission mode indicator, and information for indicating radio frame code blocks needing to be retransmitted.

In an exemplary embodiment, the step that the sending station receives the feedback frame indicating that the reception of the first radio frame fails may include that: the sending station receives the feedback frame over the specified sub-channel over which the transmission of the first radio frame ends within the predetermined time.

According to a further embodiment of the present disclosure, a data sending feedback apparatus is provided, which may be applied to a receiving station of a radio frame and may include: a detection module, arranged to detect, when reception of a radio frame fails, whether transmission of the radio frame over a specified sub-channel in a working channel ends within predetermined time; and a sending module, arranged to send, when the detection module detects that the transmission of the radio frame over the specified sub-channel in the working channel ends within the predetermined time, a feedback frame to a sending station of the radio frame.

In an exemplary embodiment, the sending module may be arranged to send the feedback frame over the specified sub-channel over which the transmission of the radio frame ends within the predetermined time.

According to a further embodiment of the present disclosure, a data sending apparatus is provided, which may be applied to a sending station and may include: a first sending module, arranged to send a first radio frame; a receiving module, arranged to receive a feedback frame indicating that reception of the first radio frame fails; and a second sending module, arranged to send, after the feedback frame is received, a second radio frame after a preset interframe space, wherein the feedback frame is sent by a receiving station after the receiving station detects that transmission of the first radio frame over a specified sub-channel in a working frame ends within predetermined time, and the second radio frame is a retransmission frame of the first radio frame.

By means of the technical solutions provided by the embodiments of the present disclosure, a feedback frame is sent to a sending station when reception of a radio frame fails and it is detected that transmission of the radio frame over a specified sub-channel in a working channel of the radio frame ends within the predetermined time. By virtue of the technical solution, the technical problem in the related art that a receiving station does not send a feedback frame upon unsuccessful reception of a radio frame and thus a sending station cannot learn a receiving condition of the radio frame in time is solved. In this way, the sending station is enabled to acquire the receiving condition of the radio frame in time and providing a strong support for subsequent data sending or retransmission.

BRIEF DESCRIPTION OF THE DRAWINGS

The accompanying drawings described herein are intended to provide further understanding of the present disclosure, and form a part of the present application. The schematic embodiments and descriptions of the present disclosure are intended to explain the present disclosure, and do not form improper limits to the present disclosure. In the accompanying drawings:

FIG. 1 is a sending flow diagram of a feedback frame according to the related art;

FIG. 2 is a flowchart of a data sending feedback method according to an embodiment of the present disclosure;

DETAILED DESCRIPTION OF THE EMBODIMENTS

Figure 3:
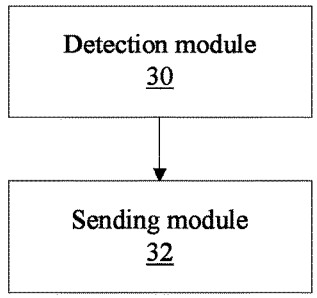
FIG. 3 is a structure block diagram of a data sending feedback apparatus according to an embodiment of the present disclosure.

The present disclosure will be described below with reference to the accompanying drawings and in conjunction with the embodiments in detail. It is important to note that the embodiments in the present application and the features in the embodiments may be combined under the condition of no conflicts.

FIG. 2 is a flowchart of a data sending feedback method according to an embodiment of the present disclosure. As shown in FIG. 2, the method includes the following processing steps.

Step S202: When reception of a radio frame fails, a receiving station detects whether transmission of the radio frame over a specified sub-channel in a working channel ends within predetermined time.

Step S204: After the receiving station detects that the transmission of the radio frame over the specified sub-channel in the working channel ends within the predetermined time, the receiving station sends a feedback frame to a sending station of the radio frame.

The feedback frame may be sent to the sending station when the reception of the radio frame fails and it is detected that transmission of the radio frame over the specified sub-channel in the working channel of the radio frame ends within the predetermined time. By virtue of the technical solution, the problem caused by the fact that a feedback frame cannot be sent to a sending station upon unsuccessful reception of a radio frame is solved. In this way, the sending station is enabled to acquire the receiving condition of the radio frame in time.

In an exemplary embodiment, the specified sub-channel may be embodied as one or more sub-channels, or may be embodied as one or more independent sub-channels using basic bandwidths. The specified sub-channel may also be a main channel.

There are many implementation modes of Step S202. In an exemplary implementation mode, Step S202 may be implemented as follows. The receiving station receives a physical preamble part of the radio frame over the specified sub-channel; the receiving station parses the physical preamble part to obtain a specified parameter; and the receiving station determines, according to the specified parameter, whether the transmission of the radio frame over the specified sub-channel ends within the predetermined time, and determines that the receiving station is a target receiving station of the radio frame. In this case, the specified parameter carries, but is not limited to, at least one of the following information:

first parameter information for indicating the target receiving station of the radio frame; and second parameter information for determining a sending duration of the radio frame. A determination mode for the latter, namely the second parameter information, may include, but is not limited to, parameter information for calculating a sending duration, or parameter information directly indicating the sending duration.

In an embodiment, the predetermined time may be ending time of the transmission of the radio frame and is determined by the receiving station according to the specified parameter.

Based on the parameter information, Step S102 may be embodied as the following forms. The receiving station determines, according to the first parameter information, that the receiving station is a target receiving station of the radio frame. The receiving station determines a sending duration of the radio frame according to the second parameter information. The receiving station determines, according to the sending duration of the radio frame, whether the transmission of the radio frame over the specified sub-channel ends within the predetermined time.

In order to better understand Step S202-S204, detailed descriptions are made hereinbelow in conjunction with an exemplary implementation process. When the receiving station unsuccessfully decodes a physical preamble part of the radio frame over any one sub-channel in the working channel and successfully decodes the physical preamble part of the radio frame over at least one sub-channel in the working channel, if the physical preamble part of the radio frame obtained according to successful decoding indicates that the receiving station is a target receiving station, the receiving station determines via calculation a radio frame sending duration according to a parameter indicated in the physical preamble part. Then the receiving station judges, according to the radio frame sending duration, whether the transmission of the radio frame over the sub-channel ends normally. When detecting that the transmission of the radio frame over at least one sub-channel ends normally, the receiving station sends a feedback frame to the sending station.

In the present embodiment, the receiving station considers that the reception of the radio frame fails under one of the following conditions.

(1) The receiving station successfully decodes a physical preamble part corresponding to the radio frame over any one sub-channel in the working channel, and unsuccessfully decodes the physical preamble part over any one sub-channel. (2) The receiving station successfully decodes the physical preamble part corresponding to the radio frame over any one sub-channel in the working channel, and a bandwidth sum of all sub-channels over which decoding is performed successfully is inconsistent with a bandwidth obtained by decoding. (3) The receiving station successfully decodes the physical preamble part corresponding to the radio frame over any one sub-channel in the working channel, but unsuccessfully decodes a data part.

In the present embodiment, the feedback frame carries at least one of the following information: unsuccessful reception of the radio frame, available sub-channel or available bandwidth information of the receiving station, and information for determining a retransmission parameter of the sending station. The information for determining the retransmission parameter of the sending station includes, but is not limited to, at least one of: link adaptation information assisting in radio frame retransmission, a radio frame retransmission mode indicator, and information for indicating radio frame code blocks needing to be retransmitted. During specification application, the information may further include, but is not limited to, parameters such as a data transmission rate expected by the receiving station, namely a data rate suggested for retransmission (the data rate is determined according to the index of a Modulation and Coding Scheme (MCS)), an error code, a bandwidth, and a delay. Thus, the sending station can acquire the receiving situation of the radio frame in time, and a strong support can be provided for optimizing data retransmission. In an exemplary embodiment, the above-mentioned information may be carried by using an information bit of the feedback frame.

In the present embodiment, the radio frame includes a physical preamble part and a data part, wherein the physical preamble part is sent over one or more sub-channels of the radio frame, and the data part is sent over the entire working channel.

There are many implementation modes of Step S202. For example, Step S202 may be implemented by detecting signal strength over an independent sub-channel for successfully decoding the physical preamble part corresponding to the radio frame.

The receiving station detects signal strength over a specified sub-channel when the physical preamble part of the radio frame is successfully decoded over the specified sub-channel, and judges, according to the signal strength, whether the transmission of the radio frame over the specified sub-channel ends.

There are many implementation modes of Step S204. For example, the radio frame may be sent by using a dedicated channel. Step S204 may also be implemented by means of the following mode: the receiving station sends the feedback frame over the specified sub-channel over which the transmission of the radio frame ends within the predetermined time.

In an exemplary implementation mode of the present embodiment, the specified sub-channel is an independent sub-channel, and the step that the receiving station sends the feedback frame over the specified sub-channel over which the transmission of the radio frame ends within the predetermined time may be embodied as the following process.

The receiving station successfully decodes a physical preamble part of the radio frame over the independent sub-channel, and the independent sub-channel is in an idle state after transmission time of the radio frame expires. The receiving station sends, after a preset interframe space, the feedback frame over one or more independent sub-channels over which the physical preamble part is successfully decoded. Contents of a data part of the feedback frame sent over a plurality of independent sub-channels are identical.

In the present embodiment, the independent sub-channel over which the physical preamble part corresponding to the radio frame is decoded successfully may be determined in the following mode. First parameter information capable of being used in calculating transmission time of the radio frame and second parameter information indicative of identification information of the target receiving station are successfully decoded from the physical preamble part. In an exemplary embodiment, the first parameter information includes: a load length of a data part of the radio frame and a transmission rate indicator used for transmitting the data part.

From the above process, it can be seen that the feedback frame may be sent when a sending channel is idle in Step S204, and in such a case, it may be determined that the independent sub-channel is in an idle state after transmission time of the radio frame expires under one of the following conditions. Received signal strength of the independent sub-channel over which the physical preamble part is decoded successfully keeps lower than a preset threshold for a preset time period after transmission time of the radio frame expires. Idle time of the independent sub-channel over which the physical preamble part is decoded successfully is compared with the transmission time of the radio frame, and when a difference between the idle time of the independent sub-channel and the transmission time of the radio frame is within a preset range, it is determined that the independent sub-channel is in the idle state.

In an exemplary embodiment, before the receiving station sends the feedback frame over the specified sub-channel over which the transmission of the radio frame ends within the predetermined time, the following process may also be executed. It is judged whether a local NAV is zero, wherein when a judgement result indicates that the local NAV is zero, the feedback frame is sent, and otherwise, the feedback frame is not sent.

In an exemplary embodiment, the specified sub-channel includes, but is not limited to, a main channel of the radio frame. For example, when relevant conditions provided above are satisfied, the feedback frame may be sent over the main channel.

In the present embodiment, a data sending feedback apparatus is also provided. The apparatus is applied to a receiving station of a radio frame. The apparatus is arranged to implement the above-mentioned method. As shown in FIG. 3, the apparatus includes:

a detection module 30, arranged to detect, when reception of a radio frame fails, whether transmission of the radio frame over a specified sub-channel in a working channel ends within predetermined time; and a sending module 32, coupled to the detection module 30, and arranged to send, when the detection module detects that the transmission of the radio frame over the specified sub-channel in the working channel ends within the predetermined time, a feedback frame to a sending station of the radio frame.

In an exemplary implementation process, the sending module 32 is further arranged to send the feedback frame over the specified sub-channel over which the transmission of the radio frame ends within the predetermined time.

It is important to note that, each of the above-mentioned modules may be implemented by means of software or hardware. The hardware may be implemented in the following form, but it is not limited thereto. The detection module 30 may be located in a first processor, and the sending module 32 may be located in a second processor. The detection module 30 and the sending module 32 may also be located in an identical processor.

Figure 4:
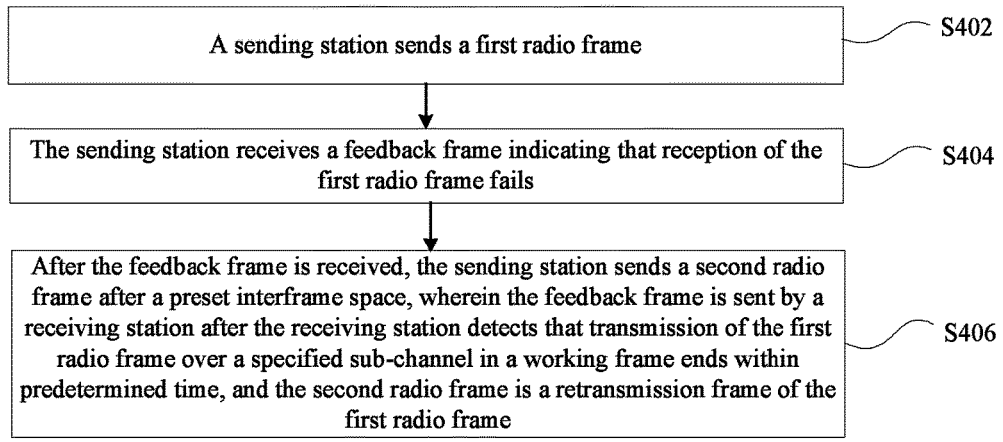
FIG. 4 is a flowchart of a data sending method according to an embodiment of the present disclosure.

In an embodiment of the present disclosure, a data sending method is also provided. As shown in FIG. 4, the method includes the following steps.

Step S402: A sending station sends a first radio frame.

Step S404: The sending station receives a feedback frame indicating that reception of the first radio frame fails.

Step S406: After the feedback frame is received, the sending station sends a second radio frame after a preset interframe space, wherein the feedback frame is sent by a receiving station after the receiving station detects that transmission of the first radio frame over a specified sub-channel in a working frame ends within predetermined time, and the second radio frame is a retransmission frame of the first radio frame.

In an exemplary embodiment, the feedback frame carries, but is not limited to, at least one of the following information: unsuccessful reception of the first radio frame, available sub-channel or available bandwidth information of the receiving station, and information for determining a retransmission parameter of the sending station.

The information for determining the retransmission parameter of the sending station may include, but is not limited to, at least one of: link adaptation information assisting in radio frame retransmission, a radio frame retransmission mode indicator, and information for indicating radio frame code blocks needing to be retransmitted.

In an exemplary implementation process, the sending station receives the feedback frame over the specified sub-channel over which the transmission of the first radio frame ends within the predetermined time.

Figure 5:
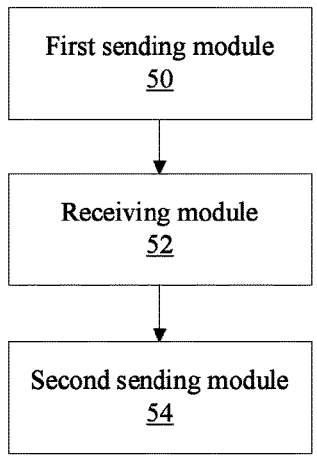
FIG. 5 is a structure block diagram of a data sending apparatus according to an embodiment of the present disclosure.

In the present embodiment, a data sending apparatus is also provided. The apparatus is applied to a sending station. As shown in FIG. 5, the apparatus includes:

a first sending module 50, arranged to send a first radio frame;

a receiving module 52, arranged to receive a feedback frame indicating that reception of the first radio frame fails; and a second sending module 54, arranged to send, after the feedback frame is received, a second radio frame after a preset interframe space, wherein the feedback frame is sent by a receiving station after the receiving station detects that transmission of the first radio frame over a specified sub-channel in a working frame ends within predetermined time, and the second radio frame is a retransmission frame of the first radio frame.

In order to better understand the above-mentioned embodiments, detailed descriptions are made hereinbelow in conjunction with exemplary embodiments.

Embodiment 1

Figure 6:
FIG. 6 is an architecture diagram of a data sending feedback system according to an exemplary embodiment of the present disclosure.

The present embodiment is based on a system consisting of a sending station 100 (STA1) and a receiving station 200 (STA2), as shown in FIG. 6.

The sending station 100 and the receiving station 200 support sending and receiving of 8 MHz data.

Figure 7:
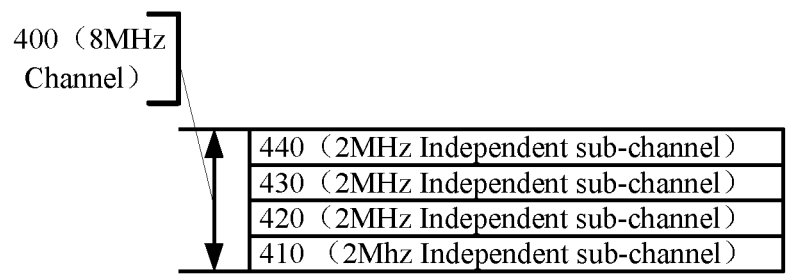
FIG. 7 is a diagram showing division of independent sub-channels according to an exemplary embodiment of the present disclosure.
Figure 8:
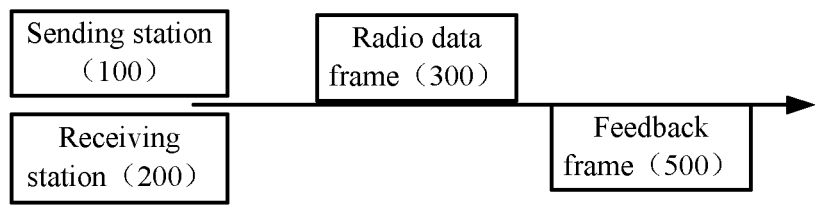
FIG. 8 is a diagram showing the frame sending principle according to an embodiment of the present disclosure.

As shown in FIG. 8, the sending station 100 sends a radio data frame 300 to the receiving station 200 over an 8 MHz working channel (400). As shown in FIG. 7, a basic bandwidth is 2 MHz, the 8 MHz working channel (400) includes four 2 MHz independent sub-channels (410, 420, 430, 440), and a main channel is a 2 MHz independent sub-channel (410) having the lowest frequency.

Figure 9:
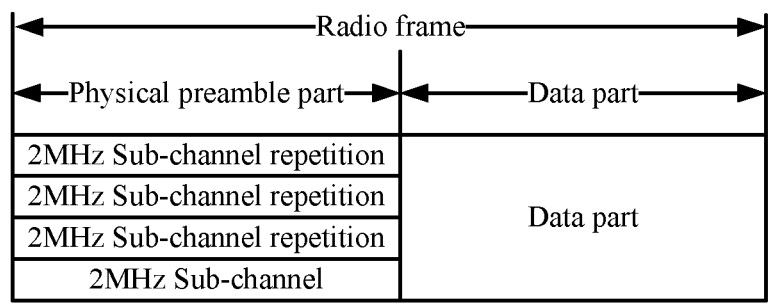
FIG. 9 is a structural diagram of a radio frame according to an exemplary embodiment of the present disclosure.

As shown in FIG. 9, the radio frame contains a physical preamble part and a data part. The physical preamble part is repeatedly sent over the four 2 MHz independent sub-channels (410, 420, 430, 440). A physical preamble signal has a predefined phase rotation over each of adjacent independent sub-channels. The data part is sent on the entire 8 MHz working channel (400).

When the receiving station 200 repeatedly sends feedback frames over a plurality of sub-channels, contents of data parts of the feedback frames over each sub-channel are identical.

The sending station 100 and the receiving station 200 have negotiated that a data sending bandwidth is 8 MHz.

When detecting that received signal strength over the independent sub-channel 410 is greater than a predefined threshold (that is, detecting that a signal level on 410 is raised), the receiving station 200 starts to receive and decode signals over the independent sub-channels (410, 420, 430, 440), and indicates that a channel is busy. Moreover, the receiving station 200 successfully receives and decodes the physical preamble part over the independent sub-channels (410, 420, 430), but the physical preamble part is unsuccessfully decoded on the independent sub-channel (440).

The receiving station 200 is determined as a target receiving station according to identification information of the target receiving station indicated by the successfully-decoded physical preamble part.

The receiving station 200 calculates actual transmission time of the data part of the radio frame 300 according to a data part length of the radio frame indicated by the successfully-decoded physical preamble part and a used MCS index.

The receiving station 200 is provided with an internal timer, the time of which is set to the calculated cut-off time for transmission of the data part of the radio frame.

The receiving station 200 continues to detect received signal strength over the independent sub-channel 410 and the independent sub-channel 420.

The receiving station 200 checks the received signal strength after the timer expires to discover that the independent sub-channel 410 and the independent sub-channel 420 are idle.

The receiving station 200 repeatedly sends the feedback frame 500 over the independent sub-channel 410 and the independent sub-channel 420 at an SIFS interval after the timer expires.

The feedback frame 500 carries an information bit, which indicates that the receiving station 200 receives the radio frame 300 unsuccessfully and indicates that both the independent sub-channel 410 and the independent sub-channel 420 are available.

Embodiment 2

A receiving station 200 detects that received signal strength over 410 is greater than a corresponding predefined threshold, starts to receive and decode signals over 410, and indicates that a main channel is busy.

The receiving station 200 detects that receiving levels over other three independent sub-channels (420, 430 and 440) are greater than a corresponding predefined threshold, so the receiving station 200 starts to receive and decode signals over the independent sub-channels 420, 430 and 440 respectively, and indicates that the independent sub-channels 420, 430 and 440 are busy respectively.

The receiving station 200 successfully receives and decodes a physical preamble part over the independent sub-channels 410, 420 and 440, but a physical preamble part is decoded over the independent sub-channel 430 unsuccessfully.

The receiving station 200 checks identification information of the target receiving station indicated by the successfully-decoded physical preamble part, and determines that it is consistent with own identification information. Accordingly, it is determined that the receiving station 200 is a target receiving station.

The receiving station 200 discovers that a sending bandwidth of a radio frame 300 is 8 MHz by means of the successfully-decoded physical preamble part.

The receiving station 200 calculates actual transmission time of a data part of the radio frame 300 according to a data part length of the radio frame indicated by the successfully-decoded physical preamble part and a used MCS index.

The receiving station 200 continues to detect the received signal strengths over the independent sub-channel 410 and the independent sub-channel 420.

The receiving station 200 detects that the received signal strength over the independent sub-channel 410 is lower than a predefined threshold and kept for a period of predefined time.

The receiving station 200 compares time at which the received signal strength over the independent sub-channel 410 is lower than the predefined threshold with the calculated cut-off time for transmission of the data part of 300, and discovers that a difference therebetween is within a predefined acceptable window.

The receiving station 200 sends the feedback frame 500 over the independent sub-channel 410 at an SIFS interval after the received signal strength over the independent sub-channel 410 is lower than the predefined threshold.

The feedback frame 500 carries an information bit, which indicates that the receiving station 200 receives the radio frame 300 unsuccessfully and indicates that the independent sub-channel 410 is available.

Embodiment 3

A receiving station 200 detects that received signal strength over an independent sub-channel 410 is greater than a corresponding predefined threshold, starts to receive and decode signals over the independent sub-channel 410, and indicates that a main channel is busy.

The receiving station 200 detects that receiving levels over the independent sub-channels 420 and 440 are greater than a corresponding predefined threshold, so the receiving station 200 starts to receive and decode signals over the independent sub-channel 420, and indicates that the independent sub-channels 420, 430 and 440 are busy.

The receiving station 200 successfully receives and decodes a physical preamble part over the independent sub-channels 410 and 420, and discovers that a sending bandwidth of a radio frame 300 is 8 MHz.

The receiving station 200 determines that identification information of the target receiving station indicated by the successfully-decoded physical preamble part is consistent with own identification information. Accordingly, it is determined that the receiving station 200 is a target receiving station.

The receiving station 200 calculates actual transmission time of a data part of the radio frame 300 according to a data part length of the radio frame indicated by the successfully-decoded physical preamble part and a used MCS index.

The receiving station 200 is provided with an internal timer, the time of which is set to the calculated cut-off time for transmission of the data part of the radio frame.

The receiving station 200 sends a feedback frame 500 over the independent sub-channel 410 at an SIFS interval after the timer expires.

The feedback frame 500 carries an information bit, which indicates that the receiving station 200 receives the radio frame 300 unsuccessfully, indicates that both the independent sub-channel 410 and the independent sub-channel 420 are available, and indicates a suggested MCS.

Embodiment 4

A receiving station 200 detects that received signal strength over an independent sub-channel 410 is greater than a corresponding predefined threshold, starts to receive and decode signals over the independent sub-channel 410, and indicates that a main channel is busy.

The receiving station 200 detects that receiving levels over the independent sub-channels 420 and 440 are greater than a corresponding predefined threshold, so the receiving station 200 starts to receive and decode signals over the independent sub-channel 420, and indicates that the independent sub-channels 420, 430 and 440 are busy.

The receiving station 200 successfully receives and decodes a physical preamble part over the independent sub-channels 410 and 420, and discovers that a sending bandwidth of a radio frame 300 is 8 MHz.

The receiving station 200 determines that identification information of the target receiving station indicated by the successfully-decoded physical preamble part is consistent with own identification information. Accordingly, it is determined that the receiving station 200 is a target receiving station.

The receiving station 200 calculates actual transmission time of a data part of the radio frame 300 according to a data part length of the radio frame indicated by the successfully-decoded physical preamble part and a used MCS index.

The receiving station 200 is provided with an internal timer, the time of which is set to the calculated cut-off time for transmission of the data part of the radio frame.

The receiving station 200 detects that the channel is idle after transmission of the radio frame ends.

The receiving station checks a local NAV. If the NAV is zero, a feedback radio frame 500 is sent. If the NAV is not zero, the feedback radio frame 500 is not sent, and receiving ends.

In conclusion, the embodiments of the present disclosure achieve the following beneficial effects.

When receiving a radio frame unsuccessfully, the receiving station may feed failure information back to the sending station, and may provide feedback information capable of being used for optimizing a transmission parameter for retransmission, thereby improving the retransmission success rate and the bandwidth efficiency.

In a further embodiment, software is also provided. The software is arranged to execute the technical solutions described in the above-mentioned embodiments and the exemplary embodiments.

In a further embodiment, a storage medium is also provided. The storage medium stores the above-mentioned software, and the storage medium includes, but is not limited to, an optical disk, a floppy disk, a hard disk, an erasable memory, and the like.

Obviously, those skilled in the art should understand that all modules or all steps in the present disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from the sequence under certain conditions, or they are manufactured into each integrated circuit module respectively, or a plurality of modules or steps therein is manufactured into a single integrated circuit module. Thus, the present disclosure is not limited to combination of any specific hardware and software.

The above is only the exemplary embodiments of the present disclosure, and not intended to limit the present disclosure. There may be various modifications and variations in the present disclosure for those skilled in the art. Any modifications, equivalent replacements, improvements and the like within the principle of the present disclosure shall fall within the protective scope defined by the appended claims of the present disclosure.

INDUSTRIAL APPLICABILITY

Based on the above-mentioned technical solution provided by the embodiments of the present disclosure, a technical way of sending a feedback frame to a sending station when reception of a radio frame fails and it is detected that transmission of the radio frame over a specified sub-channel in a working channel of the radio frame ends within predetermined time is adopted. By virtue of the technical solution, the technical problem in the related art that a receiving station does not send a feedback frame upon unsuccessful reception of a radio frame and thus a sending station cannot learn a receiving condition of the radio frame in time is solved. In this way, the sending station is enabled to acquire the receiving condition of the radio frame in time and providing a strong support for subsequent data sending or retransmission.

What is claimed is:

1. A data sending feedback method, comprising:
when reception of a radio frame fails, detecting, by a receiving station, whether transmission of the radio frame over a specified sub-channel in a working channel ends within predetermined time; and
after the receiving station detects that the transmission of the radio frame over the specified sub-channel in the working channel ends within the predetermined time, sending, by the receiving station, a feedback frame to a sending station of the radio frame;
wherein detecting, by the receiving station, whether the transmission of the radio frame over the specified sub-channel in the working channel ends within the predetermined time comprises: receiving, by the receiving station, a physical preamble part of the radio frame over the specified sub-channel; parsing, by the receiving station, the physical preamble part to obtain a specified parameter; and determining, by the receiving station according to the specified parameter, whether the transmission of the radio frame over the specified sub-channel ends within the predetermined time, and determining, by the receiving station, that the receiving station is a target receiving station of the radio frame; or,
wherein detecting, by the receiving station, whether the transmission of the radio frame over the specified sub-channel in the working channel ends within the predetermined time comprises: detecting, when the receiving station successfully decodes a physical preamble part of the radio frame over the specified sub-channel, a signal strength on the specified sub-channel; and judging, according to the signal strength, whether the transmission of the radio frame over the specified sub-channel ends.

2. The method as claimed in claim 1, wherein the predetermined time is ending time of the transmission of the radio frame and is determined by the receiving station according to the specified parameter.

3. The method as claimed in claim 2, wherein the specified parameter carries at least one of the following information:
first parameter information for indicating the target receiving station of the radio frame; and second parameter information for determining a sending duration of the radio frame.

4. The method as claimed in claim 1, wherein the receiving station considers that the reception of the radio frame fails under one of the conditions that:
the receiving station successfully decodes a physical preamble part corresponding to the radio frame over any one sub-channel in the working channel, and unsuccessfully decodes the physical preamble part over any one sub-channel;
the receiving station successfully decodes the physical preamble part corresponding to the radio frame over any sub-channel in the working channel, and a bandwidth sum of all sub-channels over which decoding is performed successfully is inconsistent with a bandwidth obtained by decoding; and
the receiving station successfully decodes the physical preamble part corresponding to the radio frame over any one sub-channel in the working channel, and unsuccessfully decodes a data part.

5. The method as claimed in claim 1, wherein the feedback frame carries at least one of the following information:
unsuccessful reception of the radio frame, available sub-channel or available bandwidth information of the receiving station, and information for determining a retransmission parameter of the sending station,
wherein the information for determining the retransmission parameter of the sending station comprises at least one of: link adaptation information assisting in radio frame retransmission, a radio frame retransmission mode indicator, and information for indicating radio frame code blocks needing to be retransmitted.

6. The method as claimed in claim 1, wherein the radio frame comprises a physical preamble part and a data part, wherein the physical preamble part is sent over one or more sub-channels of the radio frame, and the data part is sent over the entire working channel.

7. The method as claimed in claim 1, wherein sending, by the receiving station, the feedback frame to the sending station of the radio frame comprises:
sending, by the receiving station, the feedback frame over the specified sub-channel over which the transmission of the radio frame ends within the predetermined time.

8. The method as claimed in claim 7, wherein the specified sub-channel is an independent sub-channel, and sending, by the receiving station, the feedback frame over the specified sub-channel over which the transmission of the radio frame ends within the predetermined time comprises:
successfully decoding, by the receiving station, a physical preamble part of the radio frame over the independent sub-channel, the independent sub-channel being in an idle state after transmission time of the radio frame expires; and sending, by the receiving station after a preset interframe space, the feedback frame over one or more independent sub-channels over which the physical preamble part is successfully decoded.

9. The method as claimed in claim 8, wherein contents of a data part of the feedback frame sent over a plurality of independent sub-channels are identical.

10. The method as claimed in claim 8, wherein the independent sub-channel over which the physical preamble part corresponding to the radio frame is decoded successfully is determined in following mode:
    successfully decoding, from the physical preamble part, first parameter information capable of being used in calculating transmission time of the radio frame and second parameter information indicative of identification information of the target receiving station, wherein the first parameter information comprises: a load length of a data part of the radio frame and a transmission rate indicator used for transmitting the data part.

11. The method as claimed in claim 8, wherein it is determined that the independent sub-channel is in the idle state after transmission time of the radio frame expires under one of the conditions that:
    received signal strength of the independent sub-channel over which the physical preamble part is decoded successfully keeps lower than a preset threshold for a preset time period after transmission time of the radio frame expires; and
    idle time of the independent sub-channel over which the physical preamble part is decoded successfully is compared with the transmission time of the radio frame, and when a difference between the idle time of the independent sub-channel and the transmission time of the radio frame is within a preset range, it is determined that the independent sub-channel is in the idle state.

12. The method as claimed in claim 1, wherein before the receiving station sends the feedback frame over the specified sub-channel over which the transmission of the radio frame ends within the predetermined time, the method comprises:
    judging whether a local Network Allocation Vector (NAV) is zero, wherein when a judgement result indicates that the local NAV is zero, the feedback frame is sent, and otherwise, the feedback frame is not sent.

13. The method as claimed in claim 1, wherein the specified sub-channel comprises: a main channel of the radio frame.

14. A data sending method, comprising:
    sending, by a sending station, a first radio frame;
    receiving, by the sending station, a feedback frame indicating that reception of the first radio frame fails; and
    after the feedback frame is received, sending, by the sending station, a second radio frame after a preset interframe space, wherein the feedback frame is sent by a receiving station after the receiving station detects that transmission of the first radio frame over a specified sub-channel in a working frame ends within predetermined time, and the second radio frame is a retransmission frame of the first radio frame;
    wherein the receiving station detecting that transmission of the first radio frame over a specified sub-channel in a working frame ends within predetermined time comprises: receiving, by the receiving station, a physical preamble part of the radio frame over the specified sub-channel; parsing, by the receiving station, the physical preamble part to obtain a specified parameter; and determining, by the receiving station according to the specified parameter, whether the transmission of the radio frame over the specified sub-channel ends within the predetermined time, and determining, by the receiving station, that the receiving station is a target receiving station of the radio frame; or,
    wherein the receiving station detecting that transmission of the first radio frame over a specified sub-channel in a working frame ends within predetermined time comprises: detecting, when the receiving station successfully decodes a physical preamble part of the radio frame over the specified sub-channel, a signal strength on the specified sub-channel; and judging, according to the signal strength, whether the transmission of the radio frame over the specified sub-channel ends.

15. The method as claimed in claim 14, wherein the feedback frame carries at least one of the following information:
    unsuccessful reception of the first radio frame, available sub-channel or available bandwidth information of the receiving station, and information for determining a retransmission parameter of the sending station.

16. The method as claimed in claim 15, wherein the information for determining the retransmission parameter of the sending station comprises at least one of:
    link adaptation information assisting in radio frame retransmission, a radio frame retransmission mode indicator, and information for indicating radio frame code blocks needing to be retransmitted.

17. The method as claimed in claim 14, wherein receiving, by the sending station, the feedback frame indicating that the reception of the first radio frame fails comprises:
    receiving, by the sending station, the feedback frame over the specified sub-channel over which the transmission of the first radio frame ends within the predetermined time.

18. A data sending feedback apparatus, applied to a receiving station of a radio frame, the apparatus comprising a hardware processor configured to execute programming modules stored in a memory, wherein the programming modules comprise:
    a detection module, arranged to detect, when reception of a radio frame fails, whether transmission of the radio frame over a specified sub-channel in a working channel ends within predetermined time; and
    a sending module, arranged to send, when the detection module detects that the transmission of the radio frame over the specified sub-channel in the working channel ends within the predetermined time, a feedback frame to a sending station of the radio frame;
    wherein the detection module is arranged to detect whether transmission of the radio frame over a specified sub-channel in a working channel ends within predetermined time comprises: receiving a physical preamble part of the radio frame over the specified sub-channel; parsing the physical preamble part to obtain a specified parameter; and determining according to the specified parameter, whether the transmission of the radio frame over the specified sub-channel ends within the predetermined time, and determining that the receiving station is a target receiving station of the radio frame; or,
    wherein the detection module is arranged to detect whether transmission of the radio frame over a specified sub-channel in a working channel ends within predetermined time comprises: detecting, when the receiving station successfully decodes a physical preamble part of the radio frame over the specified sub-channel, a signal strength on the specified sub-channel;

and judging, according to the signal strength, whether the transmission of the radio frame over the specified sub-channel ends.

19. The apparatus as claimed in claim 18, wherein the sending module is arranged to send the feedback frame over the specified sub-channel over which the transmission of the radio frame ends within the predetermined time.

20. A data sending apparatus, applied to a sending station, the apparatus comprising a hardware processor configured to execute programming modules stored in a memory, wherein the programming modules comprise:
   a first sending module, arranged to send a first radio frame;
   a receiving module, arranged to receive a feedback frame indicating that reception of the first radio frame fails; and
   a second sending module, arranged to send, after the feedback frame is received, a second radio frame after a preset interframe space, wherein the feedback frame is sent by a receiving station after the receiving station detects that transmission of the first radio frame over a specified sub-channel in a working frame ends within predetermined time, and the second radio frame is a retransmission frame of the first radio frame;
   wherein the receiving station detecting that transmission of the first radio frame over a specified sub-channel in a working frame ends within predetermined time comprises: receiving, by the receiving station, a physical preamble part of the radio frame over the specified sub-channel; parsing, by the receiving station, the physical preamble part to obtain a specified parameter; and determining, by the receiving station according to the specified parameter, whether the transmission of the radio frame over the specified sub-channel ends within the predetermined time, and determining, by the receiving station, that the receiving station is a target receiving station of the radio frame; or,
   wherein the receiving station detecting that transmission of the first radio frame over a specified sub-channel in a working frame ends within predetermined time comprises: detecting, when the receiving station successfully decodes a physical preamble part of the radio frame over the specified sub-channel, a signal strength on the specified sub-channel; and judging, according to the signal strength, whether the transmission of the radio frame over the specified sub-channel ends.

* * * * *